US012684592B2

(12) United States Patent
Han et al.

(10) Patent No.: US 12,684,592 B2
(45) Date of Patent: Jul. 14, 2026

(54) APPARATUS AND METHOD OF CHANNEL ACCESS PRIORITY DETERMINATION FOR SIDELINK TRANSMISSION

(71) Applicant: Lenovo (Beijing) Limited, Beijing (CN)

(72) Inventors: Jing Han, Beijing (CN); Haipeng Lei, Beijing (CN); Ran Yue, Beijing (CN); Haiming Wang, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 348 days.

(21) Appl. No.: 18/275,207

(22) PCT Filed: Feb. 4, 2021

(86) PCT No.: PCT/CN2021/075246
§ 371 (c)(1),
(2) Date: Jul. 31, 2023

(87) PCT Pub. No.: WO2022/165702
PCT Pub. Date: Aug. 11, 2022

(65) Prior Publication Data
US 2025/0274952 A1      Aug. 28, 2025

(51) Int. Cl.
*H04W 72/25* (2023.01)
*H04W 28/02* (2009.01)
*H04W 74/08* (2009.01)

(52) U.S. Cl.
CPC ....... *H04W 72/25* (2023.01); *H04W 28/0268* (2013.01); *H04W 74/0875* (2013.01)

(58) Field of Classification Search
CPC .................................................. H04W 74/0875
See application file for complete search history.

(56) References Cited

U.S. PATENT DOCUMENTS

2015/0305080 A1    10/2015  Xu et al.
2020/0344771 A1*  10/2020  Kang .................... H04W 72/02

FOREIGN PATENT DOCUMENTS

CN          111901847 A    11/2020
EP            4106410 A1    12/2022
WO    2020218886 A1    10/2020

OTHER PUBLICATIONS

OPPO , "Left issues on MAC for NR-V2X", 3GPP TSG-RAN WG2 Meeting #106, R2-1905568, Reno, US [retrieved Aug. 8, 2023]. Retrieved from the Internet <https://www.3gpp.org/ftp/tsg_ran/WG2_RL2/TSGR2_106/Docs>., May 2019, 6 Pages.

(Continued)

*Primary Examiner* — Pamit Kaur
(74) *Attorney, Agent, or Firm* — FIG. 1 Patents

(57) ABSTRACT

Apparatus and methods of channel access priority determination for sidelink transmission are disclosed. The method includes: providing a mapping relationship between PC5 Quality of service (QoS) Indicators (PQIs) and Channel Access Priority Classes (CAPCs), based on delay requirements of the PQIs; and in response to presence of only STCH SDUs from one or multiple SL-DRBs in a SL-MAC PDU for SL transmission to another terminal device, to determine, from the mapping relationship, a corresponding CAPC for the SL-DRB from one or more PQIs from the SL-DRB; and to determine a CAPC for the SL-MAC PDU for SL transmission to the other terminal device, based on the corresponding CAPC of the SL-DRB; in response to presence of SCCH SDUs from one or multiple SL-SRB in the SL-MAC PDU for SL transmission to the other terminal device, to determine a corresponding CPAC of the SL-SRB; and to determine the CAPC for the SL-MAC PDU for SL transmission to the other terminal device, based on at least the corresponding CAPC of the SL-SRB as determined; and in response to presence of only a SL MAC CE for SL (Continued)

402
providing, by a processor, a mapping relationship between PC5 Quality of service (QoS) Indicators (PQIs) and Channel Access Priority Classes (CAPCs), based on delay requirements of the PQIs 404
In response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to another terminal device, to determine, from the mapping relationship, a corresponding CAPC for the SL-DRB from one or more PQIs from the SL-DRB; and to determine a CAPC for the SL-MAC PDU for SL transmission to the other terminal device, based on the corresponding CAPC of the SL-DRB 406
In response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for SL transmission to the other terminal device, to determine a corresponding CPAC of the SL-SRB; and to determine the CAPC for the SL-MAC PDU for SL transmission to the other terminal device, based on at least the corresponding CAPC of the SL-SRB as determined 408
In response to presence of only a SL Media Access Control (MAC) Control Element (CE) for SL transmission to the other terminal device, to determine a corresponding CPAC of the MAC CE; and to determine the CAPC for the SL-MAC PDU for SL transmission to the other terminal device, based on at least the corresponding CAPC of the MAC CE transmission to the other terminal device, to determine a corresponding CPAC of the MAC CE; and to determine the CAPC for the SL-MAC PDU for SL transmission to the other terminal device, based on at least the corresponding CAPC of the MAC CE.

20 Claims, 3 Drawing Sheets

(56) References Cited

OTHER PUBLICATIONS

PCT/CN2021/075246, "International Preliminary Report on Patentability", PCT Application No. PCT/CN2021/075246, Aug. 17, 2023, 5 pages.
PCT/CN2021/075246, "International Search Report and Written Opinion", PCT Application No. PCT/CN2021/075246, Sep. 28, 2021, 6 pages.
ZTE, et al., "Discussion on RRC remaining issues", 3GPP TSG RAN WG2 Meeting #109bis electronic, R2-2002564, Electronic meeting [retrieved Aug. 8, 2023]. Retrieved from the Internet <https://www.3gpp.org/ftp/TSG_RAN/WG2_RL2/TSGR2_109bis-e/Docs/>., Apr. 2020, 9 Pages.
21923727.8, "Extended European Search Report", EP Application No. 21923727.8, Sep. 23, 2024, 7 pages.
Huawei, et al., "Consideration on Channel Access Priority Class", 3GPP TSG-RAN WG2 Meeting 105bis, R2-1904119, Xian, China, Apr. 2019, 8 pages.

* cited by examiner 402
providing, by a processor, a mapping relationship between PC5 Quality of service (Qos) Indicators (PQIs) and Channel Access Priority Classes (CAPCs), based on delay requirements of the PQIs

404
in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to another terminal device, to determine, from the mapping relationship, a corresponding CAPC for the SL-DRB from one or more PQIs from the SL-DRB; and to determine a CAPC for the SL-MAC PDU for SL transmission to the other terminal device, based on the corresponding CAPC of the SL-DRB 406
in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for SL transmission to the other terminal device, to determine a corresponding CPAC of the SL-SRB; and to determine the CAPC for the SL-MAC PDU for SL transmission to the other terminal device, based on at least the corresponding CAPC of the SL-SRB as determined 408
in response to presence of only a SL Media Access Control (MAC) Control Element (CE) for SL transmission to the other terminal device, to determine a corresponding CPAC of the MAC CE; and to determine the CAPC for the SL-MAC PDU for SL transmission to the other terminal device, based on at least the corresponding CAPC of the MAC CE

Figure 4

APPARATUS AND METHOD OF CHANNEL ACCESS PRIORITY DETERMINATION FOR SIDELINK TRANSMISSION

FIELD

The subject matter disclosed herein relates generally to wireless communication and more particularly relates to, but not limited to, apparatus and methods of channel access priority determination for sidelink transmission.

BACKGROUND

The following abbreviations and acronyms are herewith defined, at least some of which are referred to within the following description.

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Equipment (UE), Network Equipment (NE), Radio Access Technology (RAT), Transmit or Transmitter (Tx), Physical Downlink Shared Channel (PDSCH), Physical Sidelink Control Channel (PSCCH), Physical Sidelink Shared Channel (PSSCH), Physical Uplink Control Channel (PUCCH), Physical Uplink Shared Channel (PUSCH), Physical Random Access Channel (PRACH), Physical Sidelink Broadcast Channel (PSBCH), Physical Broadcast Channel (PBCH), Random Access Channel (RACH), Buffer Status Report (BSR), Control Element (CE), Configured Grant (CG), Channel Occupancy Time (COT), Cyclic Prefix (CP), Channel State Information (CSI), Channel State Information Reference Signal (CSI-RS), Cellular V2X (C-V2X), Device to Device (D2D), Downlink Control Information (DCI), Demodulation Reference Signal (DMRS), Frequency Division Multiple Access (FDMA), Identification (ID), Listen Before Talk (LBT), Logical Channel Group (LCG), Logical Channel (LCH), Light Emitting Diode (LED), Media Access Control (MAC), Protocol Data Unit (PDU), Proximity Service (ProSe), Primary Synchronization Signal (PSS), Quality of Service (QoS), Random Access Response (RAR), Radio Resource Control (RRC), Reference Signal (RS), System Information Block (SIB), Sidelink (SL), Sounding Reference Signal (SRS), Secondary Synchronization Signal (SSS), Transport Block (TB), Vehicle-to-Everything (V2X), Common Control Channel (CCCH), Contention Window (CW), Dedicated Control Channel (DCCH), Frequency Range 1 (FR1), Frequency Range 2 (FR2), Service Data Unit (SDU), Technical Specification (TS), Vehicle-to-Vehicle (V2V), Vehicle-to-Infrastructure (V2I), Vehicle-to-Network (V2N), Vehicle-to-Pedestrian (V2P), Vehicle-to-Device (V2D), Vehicle-to-Grid (V2G), Logical Channel Prioritization (LCP), Network (NW), PC5 QoS Indicator (PQI), Packet Delay Budget (PDB), Demodulation Reference Signal (DM-RS), Signaling Radio Bearer (SRB), Data Radio Bearer (DRB), NR on Unlicensed band (NRU), Channel Access Priority Class (CAPC), 5G QoS Indicator (5QI), Physical Sidelink Feedback Channel (PSFCH), Sidelink Synchronization Signals (SLSS), Sidelink Traffic Channel (STCH).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Vehicle-to-everything (V2X) communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X is the key technology of the future intelligent transportation system, and its application will enhance road safety and traffic efficiency, reducing congestion and energy consumption. There are two types of V2X communication technology depending on the underlying technology being used: WLAN-based and cellular-based.

V2X communication using wireless mobile networks is called cellular V2X (or C-V2X) to differentiate it from the WLAN-based V2X. 3GPP published V2X specifications based on LTE as the underlying technology in 2016 and has continued to expand the V2X functionalities to support fifth generation (5G) access networks, which may also be referred to as New Radio (NR) access networks.

Sidelink (SL) is a proximity-based communication mechanism between device and device without going through base station, e.g. gNB or eNB. There are three scenarios for which Sidelink was defined, i.e. Scenario A, where both devices are on the cellular network and the network is coordinating or optimizing the SL communication; Scenario B, where one device is connected to the cellular network, and this device acts as a "pseudo base station" for the other out-of-range device; and Scenario C, where none of devices are connected to the cellular network.

In NRU (NR on Unlicensed band), to co-exist with other wireless technologies on unlicensed band, e.g. WiFi system, Listen Before Talk (LBT) is performed before each transmission to occupy the channel. To support LBT category 4, channel access priority class (CAPC) is defined for SRB, DRB and MAC CE and different physical layer channels, so that before UE or gNB transmits a TB or physical signal, the UE or gNB knows how to perform LBT category 4 and channel access type 1, and how long the UE or gNB can occupy the channel.

Sidelink may also operate on unlicensed band, e.g. for public safety scenario or commercial sidelink scenario. In this case, LBT mechanism in NRU needs to be introduced to co-exist with other wireless systems on unlicensed band. Before each sidelink transmission, SL UE needs to perform LBT and drop the transmission if LBT fails. And CAPC also needs to be defined for LBT on sidelink unlicensed band.

SUMMARY

Apparatus and methods of channel access priority determination for sidelink transmission are disclosed.

According to a first aspect, there is provided a method performed by a terminal device, the method comprising: providing a mapping relationship between PC5 Quality of service (QoS) Indicators (PQIs) and Channel Access Priority Classes (CAPCs), based on delay requirements of the PQIs; and in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to another terminal device, to determine, from the mapping relationship, a corresponding CAPC for the SL-DRB from one or more PQIs from the SL-DRB; and to determine a CAPC for the SL-MAC PDU for SL transmission to the other terminal device, based on the corresponding CAPC of the SL-DRB; in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for SL transmission to the other terminal device, to determine a corresponding CPAC of the SL-SRB; and to determine the CAPC for the SL-MAC PDU for SL transmission to the other terminal device, based on at least the corresponding CAPC of the SL-SRB as determined; and in response to presence of only a SL Media Access Control (MAC) Control Element (CE) for SL transmission to the other terminal device, to determine a corresponding CPAC of the MAC CE; and to determine the CAPC for the SL-MAC PDU for SL transmission to the other terminal device, based on at least the corresponding CAPC of the MAC CE.

According to a second aspect, there is provided a terminal device, comprising: a processor; a transceiver coupled to the processor; wherein the processor is configured to provide a mapping relationship between PC5 Quality of service (QoS) Indicators (PQIs) and Channel Access Priority Classes (CAPCs), based on delay requirements of the PQIs, and in response to presence of only a Sidelink Data Radio Bearer (SL-DRB) in a Sidelink Media Access Control (SL-MAC) Protocol Data Unit (PDU) for SL transmission to another terminal device, determine, from the mapping relationship, a corresponding CAPC for the SL-DRB from one or more PQIs from the SL-DRB; and determine a CAPC for the SL-MAC PDU for SL transmission to the other terminal device via the transceiver, based on the corresponding CAPC of the SL-DRB; in response to presence of a Sidelink Signaling Radio Bearer (SL-SRB) in the Sidelink Media Access Control (SL-MAC) Protocol Data Unit (PDU) for SL transmission to the other terminal device, determine a corresponding CPAC of the SL-SRB; and determine the CAPC for the SL-MAC PDU for SL transmission to the other terminal device via the transceiver, based on at least the corresponding CAPC of the SL-SRB as determined; and in response to presence of only a SL Media Access Control (MAC) Control Element (CE) for SL transmission to the other terminal device, determine a corresponding CPAC of the MAC CE; and determine the CAPC for the SL-MAC PDU for SL transmission to the other terminal device via the transceiver, based on at least the corresponding CAPC of the MAC CE.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 4 is a flow chart illustrating steps of channel access priority determination for sidelink in unlicensed spectrum by UE according to one embodiment.

DETAILED DESCRIPTION

Figure 1:
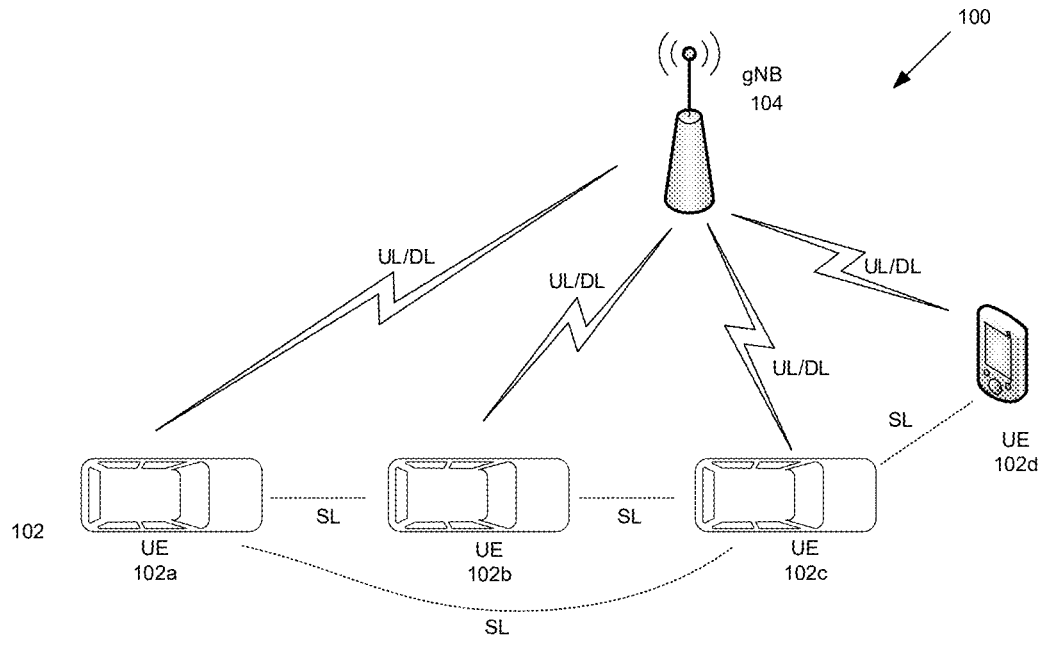
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM, or Flash memory), a portable Compact Disc Read-Only Memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", "some examples", or similar language means that a particular feature, structure, or characteristic is included in at least one embodiment or example. Thus, instances of the phrases "in one embodiment", "in an example", "in some embodiments", and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions or acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE.

Direct or indirect communication link between two or more NEs 104 may be provided.

In a V2X network, the UEs may be a vehicle or vehicle carried device 102a, 102b, 102c, or a pedestrian carried device 102d. Sidelink (SL) is a special kind of communication mechanism between UEs, i.e., Device-to-Device (D2D) communication, without going through a base station 104. In this case, the communication with a base station is not required, and proximity service (ProSe) is the feature that specifies the architecture of the direct communication between UEs. As part of ProSe service, a new D2D interface (designated as PC5, also known as sidelink at the physical layer) was introduced. Sidelink may refer to the direct communication among vehicles and other devices (e.g. V2V, V2I), and it uses PC5 interface. PC5 refers to a reference point where user equipment (UE), i.e., a mobile terminal, directly communicates with another UE over the direct channel.

Figure 2:
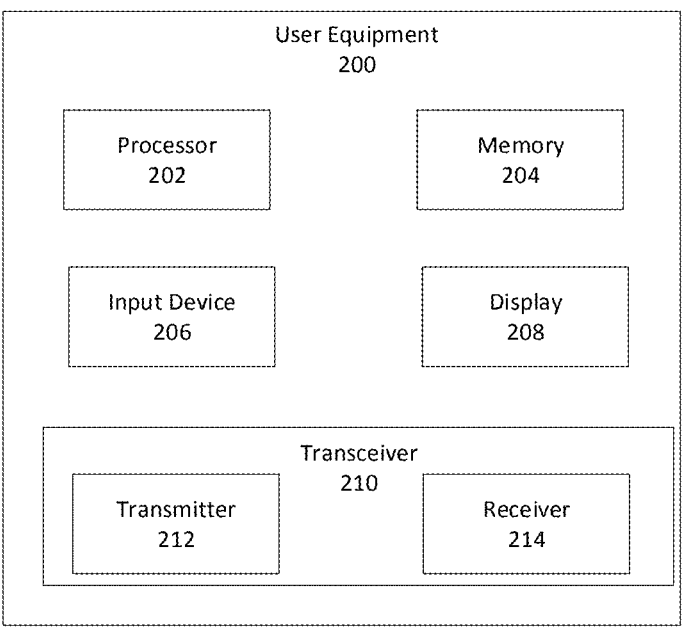
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
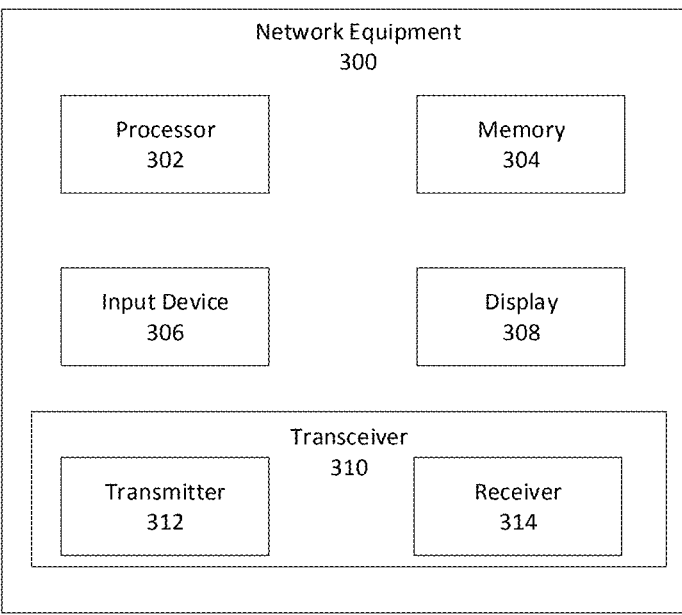
FIG. 3 is a schematic block diagram illustrating components of network equipment (NE) according to one embodiment.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

When choosing the CAPC of a DRB, the gNB takes into account the 5QIs of all the QoS flows multiplexed in that DRB while considering fairness between different traffic types and transmissions. As specified in TS 38.300, a mapping table, Table 1 as shown below, is defined for CAPC and 5QI, where a lower p value of CACP indicates a higher priority. Each standard 5QI is mapped to a CAPC according to Table 1. A non-standardized 5QI (i.e. operator specific 5QI) should use a suitable CAPC based on the table, i.e. CAPC used for a non-standardized 5QI should be the CAPC of the standardized 5QIs which best matches the traffic class, or QoS characteristics, of the non-standardized 5QI.

TABLE 1

Mapping between Channel Access Priority Classes and 5QI

| Channel Access Priority Class (p) | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | — |

NOTE:
lower CAPC value means higher priority

As specified in TS 37.213, CAPC will impact channel access delay and COT time. LBT time includes two parts, a fixed part which is $T_d = T_f$ (16 us)$+m_p*T_{sl}$ (9 us), and a random part which is randomvalue (from 0 to CW)$*T_{sl}$ (9 us). Thus, with higher priority, LBT time is shorter, but COT time is shorter; and with lower priority, LBT time is longer, but COT time is longer. UE shall not transmit on a channel for a Channel Occupancy Time that exceeds $T_{u,mcot,p}$ where the channel access procedure is performed based on the channel access priority class p associated with the UE transmissions. The following Table 2 shows examples of CAPC for uplink (UL).

TABLE 2

Channel Access Priority Class (CAPC) for UL

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:
When $T_{ulm\ cot, p}$ = 6 ms it may be increased to 8 ms by inserting one or more gaps. The minimum duration of a gap shall be 100 us. The maximum duration before including any such gap shall be 6 ms.

In the above Table 2: $CW_p$, refers to contention window for a given priority class; $CW_{max,p}$, refers to maximum contention window for a given priority class; $CW_{min,p}$, refers to minimum contention window for a given priority class; and $T_{slm\ cot,p}$, refers to maximum uplink channel occupancy time for a given priority class.

Further specified in TS 38.300, the Channel Access Priority Classes (CAPC) of radio bearers, SRBs and DRBs, and MAC CEs are either fixed or configurable. Fixed priority cases include: 1) highest priority CAPC (i.e. p=1) for SRB0, SRB1, and SRB3; 2) lowest priority CAPC (i.e. p=4) for padding BSR and recommended bit rate MAC CEs; and 3) highest priority CAPC (i.e. p=1) for other MAC CEs. Configurable priority cases include: SRB2, and DRB, where channelAccessPriority-r16 is configured in LogicalChannelConfig.

CAPC may be indicated in DCI (ChannelAccess-CPext-CAPC, indicate value in RRC configured ul-AccessConfig-ListDCI-0-1). For uplink transmission of CG, MSG3 or MSGA, and other uplink transmissions using Type 1 LBT where CAPC is not indicated in DCI, gNB may configure the following rules for UE:

i). MAC CE only case:

If only MAC CE(s) are included in the TB, the highest priority CAPC of those MAC CE(s) is used; or ii). CCCH/DCCH included case (for SRB0/SRB1/SRB2/SRB3 included case):

1). If CCCH SDU(s) are included in the TB, the highest priority CAPC is used; or 2). If DCCH SDU(s) are included in the TB, the highest priority CAPC of the DCCH(s) is used; or iii). Logical channel case:

The lowest priority CAPC of the logical channel(s) with MAC SDU multiplexed in the TB is used otherwise.

CAPCs for other physical channels are specified in TS 37.213 as p=1 for SRS, PUCCH, PRACH, and PUSCH without data.

On PC5 or sidelink, PQI is used instead of 5QI. Thus, PQI to CAPC mapping table or mapping rules need to be defined. The mapping table may be used by UE to determine CAPC for sidelink transmission.

A mapping relationship between PC5 Quality of service (QoS) Indicators (PQIs) and Channel Access Priority Classes (CAPCs), based on delay requirements of the PQIs, may be provided.

According to some examples of the disclosure, PQIs with stringent delay requirement may be mapped to the highest priority CAPC; and other POIs may be mapped to other priority CAPCs. According to some other examples, a new CAPC (e.g. p=0) with a higher priority than all existing CAPCs, may be introduced and used for the most delay critical PQIs.

In one embodiment, for LBT of sidelink transmission, PQI is classified and mapped to CAPC based on PDB or its priority. Among different PQIs, those PQIs which have a lower PDB or a higher priority are mapped to a higher priority CAPC. In one embodiment, PQI 21/22/23/55/56/57/58/90/91 are mapped to the highest priority CAPC, i.e. p=1. And PQI 59 is mapped to the third priority CAPC, i.e. p=3. An example of mapping table, Table 3, according to the embodiment is illustrated as follows.

TABLE 3

| First Example of PQI to CAPC Mapping Table | | |
|---|---|---|
| CAPC | PQI (PDB, priority) | Delay Range |
| 1 | 21 (20 ms, 3), 22 (50 ms, 4), 23 (100 ms, 3), 55 (10 ms, 3), 56 (20 ms, 6), 57 (25 ms, 5), 58 (100 ms, 4), 90 (10 ms, 3), 91 (3 ms, 2) | 3 ms, 10 ms, 20 ms, 25 ms, 50 ms, 100 ms |
| 2 | / | |
| 3 | 59 (500 ms, 6) | 500 ms |
| 4 | — | |

NOTE:
lower CAPC value means higher priority

In one example, PQI with delay requirement of less than or equal to 100 ms may be mapped to the highest priority, i.e. CAPC of p=1; PQI with delay requirement of greater than 100 ms but less than or equal to 300 ms may be mapped to CAPC of p=2; PQI with delay requirement of greater than 300 ms but less than or equal to 500 ms may be mapped to CAPC of p=3; and PQI with delay requirement of greater than 500 ms may be mapped to CAPC of p=4. Other detailed mapping rules may be used based on the principle that PQIs with more stringent delay requirement being mapped to a higher priority CAPC.

In another embodiment, a new priority CAPC, e.g. p=0, which has a higher priority than all existing CAPC priorities is introduced, and those PQIs which have a lower PDB or a higher priority is mapped to the new priority CAPC. For example, PQI 91/90/55, which have a very strict PDB (<10 ms) are mapped to the new priority CAPC, i.e. p=0. PQI 21/22/23/56/57/58 are mapped to the next priority CAPC, i.e. p=1, and PQI 59 is mapped to CAPC of p=3. An example of the mapping table, Table 4, according to the embodiment is shown below.

TABLE 4

| Second Example of PQI to CAPC Mapping Table | | |
|---|---|---|
| CAPC | PQI (PDB, priority) | Delay Range |
| 0 | 55 (10 ms, 3), 90 (10 ms, 3), 91 (3 ms, 2) | 3 ms, 10 ms, |
| 1 | 21 (20 ms, 3), 22 (50 ms, 4), 23 (100 ms, 3), 56 (20 ms, 6), 57 (25 ms, 5), 58 (100 ms, 4), | 20 ms, 25 ms, 50 ms, 100 ms |
| 2 | / | |
| 3 | 59 (500 ms, 6) | 500 ms |
| 4 | — | |

NOTE:
lower CAPC value means higher priority

By comparing Table 4 against Tables 1 and 3, it may be noted that the CAPCs of this embodiment include an additional CAPC that has a priority higher than all permissible CAPCs of 5G QoS Indicator (5QI) for Uu interface (as shown in Table 1), and the mapping relationship maps a delay critical PQI to the additional CAPC.

Since sidelink SRBs and sidelink MAC CEs are different from those on Uu interface, to support UE in determining CAPC for final sidelink transmission, CAPC for each SL SRB, DRB, and MAC CE etc. may also need to be defined.

A defined priority of CAPC for Sidelink Signaling Radio Bearer (SL-SRB), and SL Media Access Control (MAC) Control Element (CE), may be provided. The defined priority for SL-SRB and MAC CE may be the highest priority of the CAPCs. The defined priority of CAPC for Physical Sidelink Feedback Channel (PSFCH) may also be the highest priority of the CAPCs. The defined priority of CAPC for Demodulation Reference Signal (DMRS), Channel State Information Reference Signal (CSI-RS), and Physical Sidelink Control Channel (PSCCH) may be a priority of CAPC for their corresponding Physical Sidelink Shared Channels (PSSCHs).

According to some examples of the disclosure, all SL-SRBs and sidelink MAC CEs are mapped to the highest priority CAPC; for SLSS and PSBCH, channel access type 2A is used and thus CAPC is not required to be defined; PSFCH is mapped to the highest priority CAPC; and for DMRS, CSI-RS or PSCCH, the corresponding PSSCH CAPC is used.

Sidelink SRBs include SL-SRB 0, SL-SRB 1, SL-SRB 2, SL-SRB 3. Among SL-SRBs, SL-SRB 0 is used to transmit the PC5-S message(s) before the PC5-S security has been established; SL-SRB 1 is used to transmit the PC5-S messages to establish the PC5-S security; SL-SRB 2 is used to transmit the PC5-S messages after the PC5-S security has been established, which is protected; and SL-SRB 3 is used to transmit the PC5-RRC signaling, which is protected and only sent after the PC5-S security has been established. Legacy sidelink SRBs are summarized in the following Table 5.

TABLE 5

| SL-SRB in Legacy Sidelink | | | |
| --- | --- | --- | --- |
| SL-SRB index | Message | Logical channel | LCH priority |
| SL-SRB0 | Direct Communication Request | SCCH | 1 |
| SL-SRB1 | Direct Security Mode Command Direct Security Mode Complete | SCCH | 1 |
| SL-SRB2 | Protected PC5-S message | SCCH | 1 |
| SL-SRB3 | MeasurementReportSidelink RRCReconfigurationSidelink RRCReconfigurationCompleteSidelink RRCReconfigurationFailureSidelink UECapabilityEnquirySidelink UECapabilityInformationSidelink | SCCH | 1 |

In one embodiment, SL-SRB 0, SL-SRB 1, SL-SRB 2 and SL-SRB 3 are all mapped to the highest priority CAPC (i.e. with the lowest CAPC value).

For legacy sidelink transmission, SL MAC CE that transmitted over sidelink contains Sidelink CSI Reporting MAC CE. The LCP priority of Sidelink CSI Reporting MAC CE is higher than sidelink data. In one embodiment, SL MAC CE (including Sidelink CSI Reporting MAC CE) is mapped to the highest priority CAPC (ie. with the lowest CAPC value).

For legacy PUCCH, SRS, PRACH and PUSCH without data during RACH, the priority is fixed to 1. For legacy discovery burst (PSS/SSS/PBCH/DM-RS/PDSCH for SIB1), type 2A channel access procedure is used in which priority is not applicable as CAPC is only used for type 1 channel access procedure.

In one embodiment, for SLSS/PSBCH transmission, channel access type 2A procedure is used, and no CAPC is defined. In another embodiment, for PSFCH transmission, channel access type 1 procedure is used and the highest priority CAPC is used, i.e. p=1. In yet another embodiment, for DMRS/CSI-RS/PSCCH transmission, channel access type 1 procedure is used and the CAPC is the same as the corresponding PSSCH CAPC.

Implicit rules may be defined so that Tx UE can determine what CAPC is used for the TB that is to be transmitted on sidelink. UE may determine the CAPC for the TB based on the 5QI-to-CAPC mapping table, or SRB/MAC CE/LCH CAPC that is fixed or configured by gNB.

A set of defined rules for determining CAPC for Sidelink (SL) transmissions based on contents of the transmissions may be provided.

To determine CAPC used for SL transmission, different rules are defined for different cases, e.g. SCCH included case, MAC CE included case, data only case, SL CG case, etc.

SL UE may be configured in mode 1 or mode 2 for SL transmission on unlicensed band. In one example:

If the SL MAC PDU contains only data from STCH logical channels, the UE determines and selects the lowest priority CAPC of the logical channel(s) with MAC SDU multiplexed in this MAC PDU as the CAPC of the SL MAC PDU or TB to be transmitted;

If data from SCCH or SL-SRB (i.e. SL-SRB 0, SL-SRB 1, SL-SRB 2, or SL-SRB 3) is included in SL MAC PDU, the UE determines and selects the highest priority CAPC as the CAPC of the SL MAC PDU or TB to be transmitted;

If Sidelink CSI Reporting MAC CE is included in SL MAC PDU, the UE determines and selects the highest priority CAPC as the CAPC of the SL MAC PDU or TB to be transmitted; and If Tx UE will transmit on SL CG resource, the UE determines and selects the lowest priority CAPC of the logical channel(s) with MAC SDU multiplexed in this MAC PDU as the CAPC of the SL MAC PDU or TB to be transmitted.

With the above embodiments as disclosed, a final CAPC may be determined for a SL transmission on unlicensed band based on the mapping relationship, the defined priority, and the set of defined rules.

In another embodiment, if SL UE is configured in mode 1 and gNB schedules sidelink transmission, the gNB may determine CAPC for the scheduled SL transmission, and indicate the CAPC to Tx UE.

The UE receives a signaling for indication of a CAPC used by a based station or gNB in communication with the UE; and then determines whether to transmit an SL MAC PDU by comparing the indicated CAPC against the determined CAPC. Upon determining that the determined CAPC has a higher priority than the indicated CAPC, the UE transmits the SL MAC PDU during base station Channel Occupancy Time (COT); and upon determining that the determined CAPC has a lower priority than the indicated CAPC, the UE determines not to transmit the SL MAC PDU during base station COT.

To indicate CAPC to Tx UE, gNB may use RRC signalling to configure the list of possible channel access types/CP extension/CAPCs that are used for sidelink transmission; and the gNB may indicate used access types/CP extension/CAPCs by the index in DCI to Tx SL UE; and after the UE receives the indicated CAPC from the gNB, the SL UE may use the gNB indicated access types/CP extension/CAPCs for transmission using the gNB COT.

In one embodiment, SL UE is configured in mode 1 for SL transmission on unlicensed band, i.e. SL resource is scheduled by gNB. Uu interface is also based on unlicensed band, and Uu and SL are using the same unlicensed band. The gNB will use RRC signaling to configure a list of possible channel access types, CP extension, and CAPCs that can be used for sidelink transmission.

Then, when the gNB schedules SL transmission and the gNB has occupied the channel, the gNB will indicate used channel access types/CP extension/CAPCs to Tx UE, e.g. in SL grant which is for SL scheduling.

After the UE received the channel access types/CP extension/CAPC indication in SL grant, the UE will compare the gNB indicated CAPC against its determined priority value of CAPC of its own MAC PDU.

If the determined priority value is lower than the gNB indicated CAPC, i.e. the priority is higher, the UE determines to transmit the SL MAC PDU during gNB COT for corresponding sidelink transmission. If the determined priority value is greater than the gNB indicated CAPC, i.e. the priority is lower than the indicated CAPC, the UE determines not to transmit the SL MAC PDU during gNB COT.

FIG. 4 is a flow chart illustrating steps of channel access priority determination for sidelink in unlicensed spectrum by UE according to one embodiment.

At step 402, the processor 202 of the UE 200 provides a mapping relationship between PC5 Quality of service (QoS) Indicators (PQIs) and Channel Access Priority Classes (CAPCs), based on delay requirements of the PQIs.

At step 904, the processor 202 of the UE 200, in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to another terminal device, determines, from the mapping relationship, a corresponding CAPC for the SL-DRB from one or more PQIs from the SL-DRB; and determines a CAPC for the SL-MAC PDU for SL transmission to the other terminal device, based on the corresponding CAPC of the SL-DRB.

At step 906, the processor 202 of the UE 200, in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for SL transmission to the other terminal device, determines a corresponding CPAC of the SL-SRB; and determines the CAPC for the SL-MAC PDU for SL transmission to the other terminal device, based on at least the corresponding CAPC of the SL-SRB as determined.

At step 908, the processor 202 of the UE 200, in response to presence of only a SL Media Access Control (MAC) Control Element (CE) for SL transmission to the other terminal device, determines a corresponding CPAC of the MAC CE; and determines the CAPC for the SL-MAC PDU for SL transmission to the other terminal device, based on at least the corresponding CAPC of the MAC CE.

In one aspect, some items as examples of the disclosure concerning a method may be summarized as follows:

1. A method performed by a terminal device, the method comprising:

providing a mapping relationship between PC5 Quality of service (QoS) Indicators (PQIs) and Channel Access Priority Classes (CAPCs), based on delay requirements of the PQIs; and in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to another terminal device, to determine, from the mapping relationship, a corresponding CAPC for the SL-DRB from one or more PQIs from the SL-DRB; and to determine a CAPC for the SL-MAC PDU for SL transmission to the other terminal device, based on the corresponding CAPC of the SL-DRB;

in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for SL transmission to the other terminal device, to determine a corresponding CPAC of the SL-SRB; and to determine the CAPC for the SL-MAC PDU for SL transmission to the other terminal device, based on at least the corresponding CAPC of the SL-SRB as determined; and in response to presence of only a SL Media Access Control (MAC) Control Element (CE) for SL transmission to the other terminal device, to determine a corresponding CPAC of the MAC CE; and to determine the CAPC for the SL-MAC PDU for SL transmission to the other terminal device, based on at least the corresponding CAPC of the MAC CE.

2. The method of item 1, wherein the SL transmission of the SL-MAC PDU takes place on an unlicensed band.

3. The method of item 1, wherein the mapping relationship between the PQIs and the CAPCs maps a PQI with more stringent delay requirement to a CAPC of higher priority.

4. The method of item 2, wherein the CAPCs comprise an additional CAPC that has a priority higher than all permissible CAPCs of 5G QoS Indicator (5QI) for Uu interface, and the mapping relationship between the PQIs and the CAPCs maps a delay critical PQI to the additional CAPC.

5. The method of any one of items 1 to 3, wherein the corresponding CAPC for the SL-SRB is to be associated with the highest priority of the CAPCs.

6. The method of any one of items 1 to 3, wherein the corresponding CAPC for the MAC CE is to be associated with the highest priority of the CAPCs.

7. The method of any one of items 1 to 3, further comprising: associating a corresponding CAPC for Physical Sidelink Feedback Channel (PSFCH) with the highest priority of the CAPCs.

8. The method of any one of items 1 to 3, further comprising: in response to presence of a Sidelink Control Channel (SCCH) or the SL-SRB in the SL MAC Protocol Data Unit (PDU), associating a CAPC of the highest priority is used for transmission of the SL-MAC PDU.

9. The method of any one of items 1 to 3, further comprising: upon determining that a Sidelink Media Access Control (SL MAC) Control Element (CE) is included in the SL MAC PDU, associating the CAPC for the SL-MAC PDU with the highest priority for SL transmission.

10. The method of any one of items 1 to 3, further comprising: in response to presence of only data in the SL-MAC PDU, associating the CAPC for the SL-MAC PDU with the lowest priority of the CAPCs SL transmission.

11. The method of any one of items 1 to 10, further comprising:

receiving a signaling for indication of a CAPC used by a base station; and determining whether to transmit the SL-MAC PDU by comparing the indicated CAPC against the determined CAPC for the SL-MAC PDU for SL transmission.

12. The method of item 11, further comprising, upon determining that the determined CAPC for the SL-MAC PDU has a higher priority than the indicated CAPC, transmitting the SL MAC PDU.

13. The method of item 11, wherein the SL MAC PDU is transmitted within a base station Channel Occupancy Time (COT).

14. The method of item 11, further comprising, upon determining that the determined CAPC for the SL-MAC PDU has a lower priority than the indicated CAPC, not transmitting the SL-MAC PDU.

In another aspect, some items as examples of the disclosure concerning an apparatus may be summarized as follows:

15. A terminal device, comprising:

a processor;

a transceiver coupled to the processor;

wherein the processor is configured to provide a mapping relationship between PC5 Quality of service (QoS) Indicators (PQIs) and Channel Access Priority Classes (CAPCs), based on delay requirements of the PQIs, and in response to presence of only a Sidelink Data Radio Bearer (SL-DRB) in a Sidelink Media Access Control (SL-MAC) Protocol Data Unit (PDU) for SL transmission to another terminal device, determine, from the mapping relationship, a corresponding CAPC for the SL-DRB from one or more PQIs from the SL-DRB; and

17 determine a CAPC for the SL-MAC PDU for SL trans-
mission to the other terminal device via the transceiver,
based on the corresponding CAPC of the SL-DRB;
in response to presence of a Sidelink Signaling Radio
Bearer (SL-SRB) in the Sidelink Media Access Control
(SL-MAC) Protocol Data Unit (PDU) for SL
transmission to the other terminal device,
determine a corresponding CPAC of the SL-SRB; and
determine the CAPC for the SL-MAC PDU for SL
transmission to the other terminal device via the trans-
ceiver, based on at least the corresponding CAPC of the
SL-SRB as determined; and
in response to presence of only a SL Media Access
Control (MAC) Control Element
(CE) for SL transmission to the other terminal device,
determine a corresponding CPAC of the MAC CE; and
determine the CAPC for the SL-MAC PDU for SL
transmission to the other terminal device via the trans-
ceiver, based on at least the corresponding CAPC of the
MAC CE.

16. The terminal device of item 15, wherein the SL
transmission of the SL-MAC PDU takes place on an unli-
censed band.

17. The terminal device of item 15, wherein the mapping
relationship between the PQIs and the CAPCs maps a PQI
with more stringent delay requirement to a CAPC of higher
priority.

18. The terminal device of item 16, wherein the CAPCs
comprise an additional CAPC that has a priority higher than
all permissible CAPCs of 5G QoS Indicator (5QI) for Uu
interface, and the mapping relationship between the PQIs
and the CAPCs maps a delay critical PQI to the additional
CAPC.

19. The terminal device of any one of items 15 to 17,
wherein the corresponding CAPC for the SL-SRB is to be
associated with the highest priority of the CAPCs.

20. The terminal device of any one of items 15 to 17,
wherein the corresponding CAPC for the MAC CE is to be
associated with the highest priority of the CAPCs.

21. The terminal device of any one of items 15 to 17,
further comprising: associating a corresponding CAPC for
Physical Sidelink Feedback Channel (PSFCH) with the
highest priority of the CAPCs.

22. The terminal device of any one of items 15 to 17,
further comprising: in response to presence of a Sidelink
Control Channel (SCCH) or the SL-SRB in the SL MAC
Protocol Data Unit (PDU), associating a CAPC of the
highest priority is used for transmission of the SL-MAC
PDU.

23. The terminal device of any one of items 15 to 17,
further comprising: upon determining that a Sidelink Media
Access Control (SL MAC) Control Element (CE) is included
in the SL MAC PDU, associating the CAPC for the SL-
MAC PDU with the highest priority for SL transmission.

24. The terminal device of any one of items 15 to 17,
further comprising: in response to presence of only data in
the SL-MAC PDU, associating the CAPC for the SL-MAC
PDU with the lowest priority of the CAPCs SL transmission.

25. The terminal device of any one of items 15 to 24,
further comprising:
receiving a signaling for indication of a CAPC used by a
base station; and
determining whether to transmit the SL-MAC PDU by
comparing the indicated CAPC against the determined
CAPC for the SL-MAC PDU for SL transmission.

26. The terminal device of item 25, further comprising,
upon determining that the determined CAPC for the SL-MAC PDU has a higher priority than the indicated CAPC,
transmitting the SL MAC PDU.

27. The terminal device of item 25, wherein the SL MAC
PDU is transmitted within a base station Channel Occu-
pancy Time (COT).

28. The terminal device of item 25, further comprising,
upon determining that the determined CAPC for the SL-
MAC PDU has a lower priority than the indicated CAPC,
not transmitting the SL-MAC PDU.

Various embodiments and/or examples are disclosed to
provide exemplary and explanatory information to enable a
person of ordinary skill in the art to put the disclosure into
practice. Features or components disclosed with reference to
one embodiment or example are also applicable to all
embodiments or examples unless specifically indicated oth-
erwise.

Embodiments may be practiced in other specific forms.
The described embodiments are to be considered in all
respects only as illustrative and not restrictive. The scope is,
therefore, indicated by the appended claims rather than by
the foregoing description. All changes which come within
the meaning and range of equivalency of the claims are to be
embraced within their scope.

What is claimed is:

1. A user equipment (UE) for wireless communication,
comprising:
at least one memory; and
at least one processor coupled with the at least one
memory and configured to cause the UE to:
provide a mapping relationship between PC5 Quality of
service (QoS) Indicators (PQIs) and Channel Access
Priority Classes (CAPCs), based on one or more
delay requirements of the PQIs; and
in response to presence of only a Sidelink Data Radio
Bearer (SL-DRB) in a Sidelink Media Access Con-
trol (SL-MAC) Protocol Data Unit (PDU) for SL
transmission to an other UE:
determine, from the mapping relationship, a corre-
sponding CAPC for the SL-DRB from one or
more PQIs from the SL-DRB; and
determine a CAPC for the SL-MAC PDU for the SL
transmission to the other UE based on the corre-
sponding CAPC of the SL-DRB;
in response to presence of a Sidelink Signaling Radio
Bearer (SL-SRB) in the Sidelink Media Access Con-
trol (SL-MAC) Protocol Data Unit (PDU) for the SL
transmission to the other UE:
determine a corresponding CPAC of the SL-SRB;
and
determine the CAPC for the SL-MAC PDU for the
SL transmission to the other UE based on at least
the corresponding CAPC of the SL-SRB as deter-
mined; and
in response to presence of only a SL Media Access
Control (MAC) Control Element (CE) for the SL
transmission to the other UE:
determine a corresponding CPAC of the MAC CE;
and
determine the CAPC for the SL-MAC PDU for the SL
transmission to the other UE based on at least the
corresponding CAPC of the MAC CE.

2. A user equipment (UE) for wireless communication,
comprising:
at least one memory; and
at least one processor coupled with the at least one
memory and configured to cause the UE to:

provide a mapping relationship between PC5 Quality of service (QoS) Indicators (PQIs) and Channel Access Priority Classes (CAPCs), based on one or more delay requirements of the PQIs; and in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to an other UE:

determine, from the mapping relationship, a corresponding CAPC for the one or multiple SL-DRBs from one or more PQIs from the one or multiple SL-DRBs; and determine a CAPC for the SL-MAC PDU for the SL transmission to the other UE based on the corresponding CAPC of the one or more multiple SL-DRBs;

in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for the SL transmission to the other UE:

determine a corresponding CPAC of the SL-SRB; and determine the CAPC for the SL-MAC PDU for the SL transmission to the other UE based on at least the corresponding CAPC of the SL-SRB as determined; and in response to presence of only a SL Media Access Control (MAC) Control Element (CE) for the SL transmission to the other UE:

determine a corresponding CPAC of the MAC CE; and determine the CAPC for the SL-MAC PDU for the SL transmission to the other UE based on at least the corresponding CAPC of the MAC CE.

3. The UE of claim 2, wherein the SL transmission of the SL-MAC PDU takes place on an unlicensed band.

4. The UE of claim 2, wherein the mapping relationship between the PQIs and the CAPCs maps a PQI with more stringent delay requirement to a CAPC of higher priority.

5. The UE of claim 3, wherein the CAPCs comprise an additional CAPC that has a priority higher than all permissible CAPCs of 5G QoS Indicator (5QI) for Uu interface, and the mapping relationship between the PQIs and the CAPCs maps a delay critical PQI to the additional CAPC.

6. The UE of claim 2, wherein the corresponding CAPC for the SL-SRB is to be associated with a highest priority of the CAPCs.

7. The UE of claim 2, wherein the corresponding CAPC for the MAC CE is to be associated with a highest priority of the CAPCs.

8. The UE of claim 2, wherein the at least one processor is configured to cause the UE to associate a corresponding CAPC for Physical Sidelink Feedback Channel (PSFCH) with a highest priority of the CAPCs.

9. The UE of claim 2, wherein the at least one processor is configured to cause the UE to associate, in response to presence of a Sidelink Control Channel (SCCH) or the SL-SRB in the SL MAC Protocol Data Unit (PDU), a CAPC of a highest priority is used for transmission of the SL-MAC PDU.

10. The UE of claim 2, wherein the at least one processor is configured to cause the UE to associate, upon determining that a Sidelink Media Access Control (SL MAC) Control Element (CE) is included in the SL MAC PDU, the CAPC for the SL-MAC PDU with a highest priority for the SL transmission.

11. The UE of claim 2, wherein the at least one processor is configured to cause the UE to associate, in response to presence of only data in the SL-MAC PDU, the CAPC for the SL-MAC PDU with a lowest priority of the CAPCs SL transmission.

12. The UE of claim 2, wherein the at least one processor is configured to cause the UE to:

receive a signaling for indication of a CAPC used by a base station; and determine whether to transmit the SL-MAC PDU by comparing the indicated CAPC against the determined CAPC for the SL-MAC PDU for the SL transmission.

13. The UE of claim 12, wherein the at least one processor is configured to cause the UE to transmit, upon determining that the determined CAPC for the SL-MAC PDU has a higher priority than the indicated CAPC, the SL MAC PDU.

14. The UE of claim 12, wherein the at least one processor is configured to cause the UE to transmit the SL MAC PDU within a base station Channel Occupancy Time (COT).

15. The UE of claim 12, wherein the at least one processor is configured to cause the UE to upon determining that the determined CAPC for the SL-MAC PDU has a lower priority than the indicated CAPC, not transmit the SL-MAC PDU.

16. A processor for wireless communication, comprising:

at least one controller coupled with at least one memory and configured to cause the processor to:

provide a mapping relationship between PC5 Quality of service (QoS) Indicators (PQIs) and Channel Access Priority Classes (CAPCs), based on one or more delay requirements of the PQIs; and in response to presence of only Sidelink Traffic Channel (STCH) Service Data Units (SDUs) from one or multiple Sidelink Data Radio Bearers (SL-DRBs) in a Sidelink Media Access Control (SL-MAC) Protocol Data Unit (PDU) for SL transmission to a UE:

determine, from the mapping relationship, a corresponding CAPC for the one or multiple SL-DRBs from one or more PQIs from the one or multiple SL-DRBs; and determine a CAPC for the SL-MAC PDU for the SL transmission to the UE based on the corresponding CAPC of the one or more multiple SL-DRBs;

in response to presence of Sidelink Control Channel (SCCH) Service Data Unit (SDUs) from one or multiple Sidelink Signaling Radio Bearer (SL-SRB) in the Sidelink Media Access Control (SL-MAC) Protocol Data Unit (PDU) for the SL transmission to the UE:

determine a corresponding CPAC of the SL-SRB; and determine the CAPC for the SL-MAC PDU for the SL transmission to the UE based on at least the corresponding CAPC of the SL-SRB as determined; and in response to presence of only a SL Media Access Control (MAC) Control Element (CE) for the SL transmission to the UE:

determine a corresponding CPAC of the MAC CE; and determine the CAPC for the SL-MAC PDU for the SL transmission to the UE based on at least the corresponding CAPC of the MAC CE.

17. The processor of claim 16, wherein the SL transmission of the SL-MAC PDU takes place on an unlicensed band.

18. The processor of claim 16, wherein the mapping relationship between the PQIs and the CAPCs maps a PQI with more stringent delay requirement to a CAPC of higher priority.

19. The processor of claim 17, wherein the CAPCs comprise an additional CAPC that has a priority higher than all permissible CAPCs of 5G QoS Indicator (5QI) for Uu interface, and the mapping relationship between the PQIs and the CAPCs maps a delay critical PQI to the additional CAPC.

20. A processor for wireless communication, comprising:
at least one controller coupled with at least one memory and configured to cause the processor to:
  provide a mapping relationship between PC5 Quality of service (QoS) Indicators (PQIs) and Channel Access Priority Classes (CAPCs) based on one or more delay requirements of the PQIs; and
  in response to presence of only a Sidelink Data Radio Bearer (SL-DRB) in a Sidelink Media Access Control (SL-MAC) Protocol Data Unit (PDU) for SL transmission to a UE:

determine, from the mapping relationship, a corresponding CAPC for the SL-DRB from one or more PQIs from the SL-DRB; and
  determine a CAPC for the SL-MAC PDU for the SL transmission to the UE based on the corresponding CAPC of the SL-DRB;
in response to presence of a Sidelink Signaling Radio Bearer (SL-SRB) in the Sidelink Media Access Control (SL-MAC) Protocol Data Unit (PDU) for the SL transmission to the UE:
  determine a corresponding CPAC of the SL-SRB; and
  determine the CAPC for the SL-MAC PDU for the SL transmission to the UE based on at least the corresponding CAPC of the SL-SRB as determined; and
in response to presence of only a SL Media Access Control (MAC) Control Element (CE) for the SL transmission to the UE:
  determine a corresponding CPAC of the MAC CE; and
  determine the CAPC for the SL-MAC PDU for the SL transmission to the UE based on at least the corresponding CAPC of the MAC CE.

* * * * *